(12) United States Patent
Tang

(10) Patent No.: US 8,520,162 B2
(45) Date of Patent: Aug. 27, 2013

(54) BACK LIGHT MODULE AND LIQUID CRYSTAL DISPLAY THEREOF

(75) Inventor: Guofu Tang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 222 days.

(21) Appl. No.: 13/145,523

(22) PCT Filed: Mar. 14, 2011

(86) PCT No.: PCT/CN2011/074321
§ 371 (c)(1),
(2), (4) Date: Jul. 21, 2011

(87) PCT Pub. No.: WO2012/122739
PCT Pub. Date: Sep. 20, 2012

(65) Prior Publication Data
US 2012/0236228 A1 Sep. 20, 2012

(30) Foreign Application Priority Data
Mar. 14, 2011 (CN) .......................... 2011 1 0060407

(51) Int. Cl.
*G02F 1/1333* (2006.01)

(52) U.S. Cl.
USPC .................. 349/60; 349/58; 349/59; 349/62; 349/63; 349/64; 349/65; 349/66; 349/67; 349/68; 349/69

(58) Field of Classification Search
USPC .......................................... 349/58–60, 62–69
See application file for complete search history.

(56) References Cited

U.S. PATENT DOCUMENTS
7,578,610 B2 * 8/2009 Sakamoto et al. ............ 362/634

* cited by examiner

*Primary Examiner* — Phu Vu
(74) *Attorney, Agent, or Firm* — Troutman Sanders LLP

(57) ABSTRACT

This invention relates to a back light module and a liquid crystal display thereof. The back light module includes a rear panel, an LGP, a PCB, a plurality of LEDs and at least an elastic clamping fastener. The rear panel includes a base plate and at least a sidewall. The LGP is positioned on the base plate. The PCB opposite to the LGP is positioned on the sidewall of the rear panel. The LEDs are positioned on the PCB. At least an elastic clamping fastener successively passes through the rear panel and the PCB to fasten the rear panel and the PCB. In addition, the top of the elastic clamping fastener is higher than the surface of the LEDs. The back light module and the liquid crystal display thereof in this invention are simple in structure, convenient in assembly, and low in cost.

16 Claims, 4 Drawing Sheets

BACK LIGHT MODULE AND LIQUID CRYSTAL DISPLAY THEREOF

BENEFIT CLAIMS

This application is a U.S. National Stage of International Application No. PCT/CN2011/074321, filed May 19, 2011, which claims the benefit of CN 201110060407.X file Mar. 14, 2011

FIELD OF THE INVENTION

This invention relates to a back light module and an LCD thereof, in particular to a side-light type back light module and an LCD comprising the side-light type back light module.

BACKGROUND OF THE INVENTION

The existing back light module usually includes a light guide plate (LGP), a rear panel, a PCB (Printed Circuit Board), and a plurality of LEDs (Light Emitting Diodes) fixed on the PCB. Generally, there are two following kinds of fixed modes of the PCB: a, a heat conductive adhesive tape is pasted between the PCB and the rear panel; b, a screw is used to lock and attach the PCB and the rear panel. Wherein, the advantage of mode a is that the heat conductive adhesive tape can fill in the gap between the two interfaces, but the cost of the heat conductive adhesive tape is high. The mode b can reach the close contact of the two interfaces. The cost of the screw is lower than that of the heat conductive adhesive tape. However, the PCB is generally narrow and the adopted screw is relatively small, and thereby causing difficulties on locking and attaching task.

Besides, in the known side-light type back light module, the LGP usually positions left and right ends only by the rear panel to ensure a distance between the LGP and the LED surface. After the LGP is heated and expands, the swell capacity of the LGP in the central position of the module is the maximum, making a light input surface of the LGP directly support the LED surface. Since the surface temperature of the LED is extremely high, the LGP is easily melted.

Therefore, the technical problems including assembling difficulty, high cost, and easily melting of the LGP exist in the back light module of the prior art.

SUMMARY OF THE INVENTION

The main purpose of this invention lies in providing a back light module with convenient assembly, low cost, and the resistance of the LGP melting by the LED; this invention also provides an LED comprising the back light module.

A back light module includes a rear panel, an LGP, a PCB, and a plurality of LEDs. The rear panel includes a base plate and at least a sidewall. The LGP is positioned on the base plate. The LGP opposite to the PCB is positioned on the sidewall of the rear panel. The LEDs are positioned on the PCB. The back light module further includes at least an elastic clamping fastener. The elastic clamping fastener successively passes through the rear panel and the PCB to fasten the rear panel and the PCB. Besides, the top of the elastic clamping fastener is higher than the LED surface.

Preferably, the sidewall of the rear panel is equipped with at least a first through-hole. The PCB is equipped with at least a second through-hole opposite to the first through-hole. The elastic clamping fastener successively passes through the first through-hole and the second through-hole to fasten the rear panel and the PCB.

Preferably, the elastic clamping fastener includes a base plate, a fastener, and a long rod connecting the base plate and the fastener. The base plate is positioned on one side of the sidewall of the rear panel. The long rod is positioned in the first through-hole and the second through-hole of the PCB. The fastener is positioned on one side of the PCB.

Preferably, the LGP includes a light input surface. The fastener includes a top. The surface of the top, a flat surface parallel to the light input surface of the LGP, is higher than the LED surface.

Preferably, the fastener further includes at least an elastic wedge-shaped protuberance. A first end of the elastic wedge-shaped protuberance connects the top and a second end is an elastic and bent free end. Preferably, the quantity of the elastic wedge-shaped protuberance is two and the two elastic wedge-shaped protuberances are symmetrical on the top.

Preferably, the outside surface of the elastic wedge-shaped protuberance is an inclined plane. The inclined plane and the long rod form an acute angle. There is a gap between the inside surface of the elastic wedge-shaped protuberance and the long rod. The gap is used to provide a bent space for the elastic wedge-shaped protuberance.

Preferably, the second end of the elastic wedge-shaped protuberance extends to form a bulge with the second through-hole of the PCB.

Preferably, the long rod includes a first part and a second part with unequal diameters. The diameter of the first part is equal to the diameter of the first through-hole and the second through-hole. The diameter of the second part is less than the diameter of the first part.

Preferably, under the state that the second end bends to the maximum, the outside surface of the elastic wedge-shaped protuberance is a flat surface parallel to the long rod. The distance between the two outside surfaces of elastic and bent wedge-shaped protuberance is equal to the diameter of the first through-hole and the second through-hole.

Preferably, the distance between the outsides of the bulges of the two elastic wedge-shaped protuberances is greater than the diameter of the second through-hole of the PCB.

Preferably, the elastic clamping fastener is equipped by intervals with the two LEDs.

Preferably, the base plate of the rear panel is equipped with a bulge to support the LGP. The bulge is used to make the LGP positioned in the height opposite to the LED.

Preferably, a cooling fin is equipped between the PCB and the rear panel. The elastic clamping fastener successively passes through the rear panel, the cooling fin, and the PCB to fasten the PCB and the rear panel.

Preferably, the base plate of the rear panel is a surface plate. The corresponding position of the base plate of the cooling fin is equipped with the protuberance to support the LGP in order to make the LGP positioned in the height opposite to the LED.

An LED includes a LED panel and a back light module. The back light module includes a rear panel, an LGP, a PCB, and a plurality of LEDs. The rear panel includes a base plate and at least a sidewall. The LGP is positioned on the base plate. The LGP opposite to the PCB is equipped on the sidewall of the rear panel. A plurality of LEDs are equipped on the PCB, which is characterized in that the back light module further includes at least an elastic clamping fastener. The at least one elastic clamping fastener successively passes through the rear panel and the PCB to fasten the rear panel and the PCB. Besides, the top of the elastic clamping fastener is higher than the LED surface.

Preferably, the sidewall of the rear panel is equipped at least a first through-hole. The PCB is equipped with at least a second through-hole opposite to the first through-hole. The elastic clamping fastener successively passes through the first through-hole and the second through-hole to fasten the rear panel and the PCB.

Preferably, the elastic clamping fastener includes a base plate, a fastener, and a long rod connecting the base plate and the fastener. The base plate is positioned on one side of the sidewall of the rear panel. The long rod is positioned in the first through-hole and the second through-hole of the PCB. The fastener is positioned on one side of the PCB.

Preferably, the LGP includes a light input surface. The fastener includes a top. The surface of the top, a flat surface parallel to the light input surface of the LGP, is higher than the LED surface.

Preferably, the fastener furthers includes at least an elastic wedge-shaped protuberance. A first end of the at least one elastic wedge-shaped protuberance connects the top; a second end is an elastic and bent free end.

Compared with the prior art, this invention provides the back light module and the LED thereof, and adopts the elastic clamping fastener to fasten the PCB and the rear panel. At the same time, since the elastic clamping fastener is higher than the LED surface, the LGP firstly contacts the top of the elastic clamping fastener and the top supports the LGP when the LGP deforms due to reasons such as thermal expansion or assembling allowance etc., which avoids that the LGP is melted when touching the high-temperature surface of the LED. With low cost, the back light module of this invention is easily assembled and can prevent the LGP from melting.

DESCRIPTION OF ATTACHED DRAWINGS

DETAILED DESCRIPTION OF THE EMBODIMENTS

Figure 1:
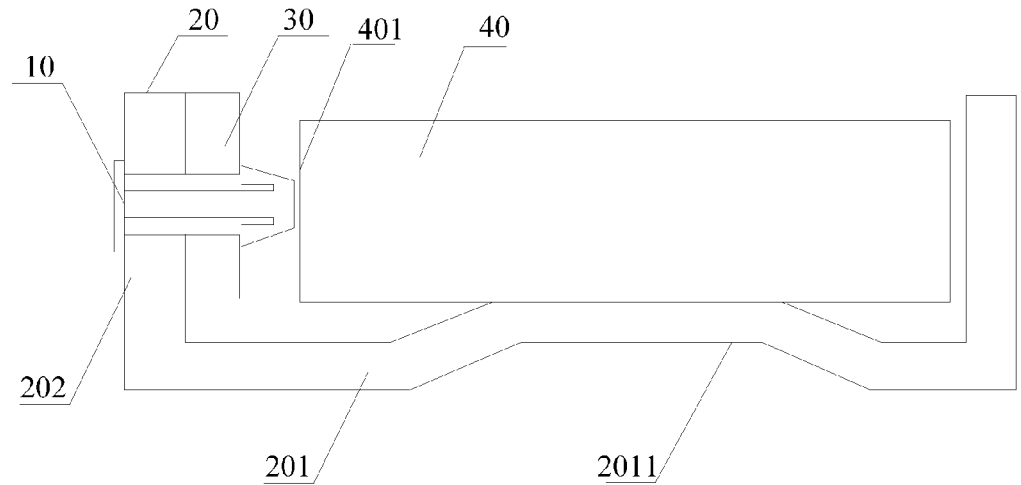
FIG. 1 is the section view enlarged drawing of the first embodiment of the back light module of this invention.
Figure 2:
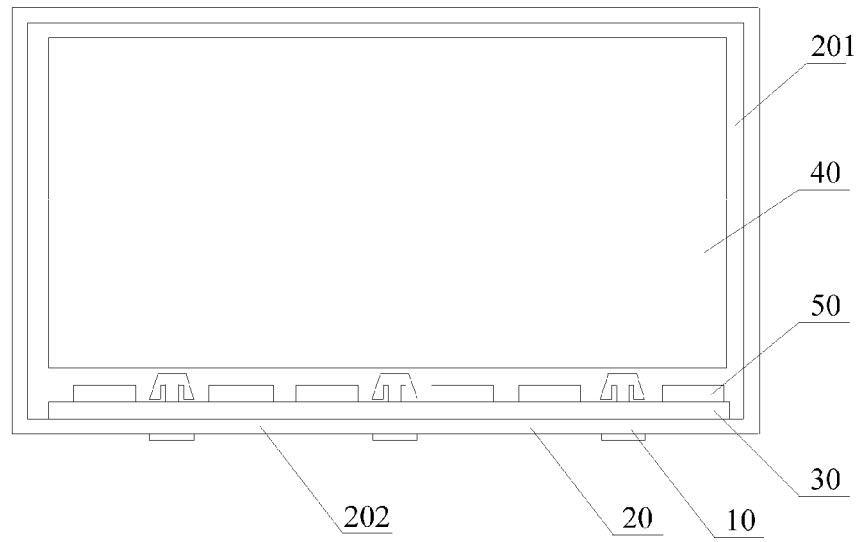
FIG. 2 is the top view of the back light module shown in FIG. 1.

As shown in FIG. 1 and FIG. 2, the back light module of an embodiment of this invention includes: an LGP 40, a PCB 30, a rear panel 20, a plurality of LEDs 50 and at least a elastic clamping fastener 10. Wherein, the rear panel 20 includes a base plate 201 and a sidewall 202. The LGP 40 is positioned on the base plate 201. The LGP 40 includes a light input surface 401, a bottom surface (not labeled) and a light output surface (not labeled) opposite to the bottom surface. The PCB 30 is positioned in the internal surface of the sidewall 202 of the rear panel 20. The PCB 30 is opposite to the light input surface 401 of the LGP 40.

A plurality of LEDs 50 is arranged on the PCB 30, which is opposite to the light input surface 401 of the LGP 40. The base plate 201 of the rear panel 20 is equipped with a bulge 2011 supporting the LGP 40 to make the LGP 40 be positioned in the height opposite to the LED 50. The elastic clamping fastener 10 is equipped by intervals with every two LEDs 50. The material of the elastic clamping fastener 10 can be plastic materials or metal materials.

The sidewall 202 of the rear panel 20 is equipped with a plurality of first through-holes (not labeled). The PCB 30 is equipped with a plurality of second through-holes (not labeled) opposite to the first through-holes; the elastic clamping fastener 10 successively passes through the first through-hole of the rear panel 10 and the second through-hole of the PCB 30 to fasten the rear panel 10 and the PCB 30. The first through-hole and the second through-hole are round through-holes with the same semi diameter.

Figure 3:
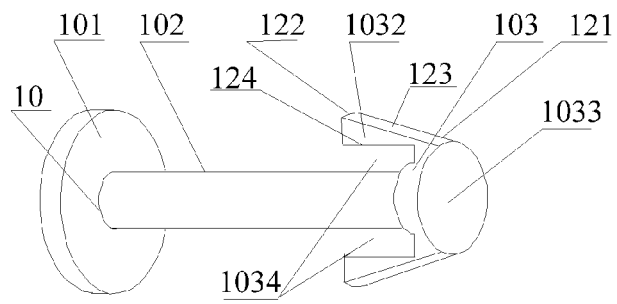
FIG. 3 is the solid enlarged drawing of the elastic clamping fastener in the first embodiment of the back light module of this invention.
Figure 4:
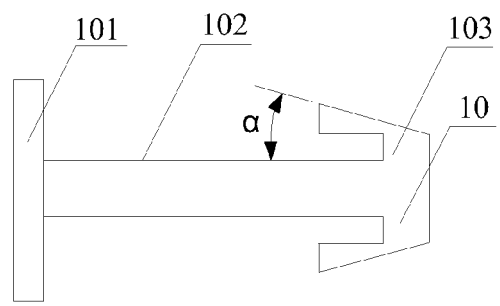
FIG. 4 is the main view enlarged drawing of the elastic clamping fastener shown in FIG. 3.

Specifically, please refer to FIG. 3 and FIG. 4 together. The elastic clamping fastener 10 of the first embodiment includes a base plate 101, a fastener 103, and a long rod 102 connecting the base plate 101 and the fastener 103. The base plate 101 is positioned on an outside surface of the sidewall 202 of the rear panel 20; the long rod 102 is positioned in the first through-hole of the sidewall 202 and the second through-hole of the PCB 30; the fastener 103 is positioned on the surface of the PCB 30. The long rod 102 is a cylinder with the semi diameter less than the first through-hole and the second through-hole.

The fastener 103 includes a top 1033 and two elastic wedge-shaped protuberances 1032. The top 1033 is approximately a circular disk shape. The surface (not labeled) of the top 1033 is a flat surface parallel to the light input surface 401 of the LGP 40, and higher than the surface of the LED 50 to press the LGP 40 while the LGP is expanding, which will not damage the light input surface 401 thereof either. The two elastic wedge-shaped protuberances 1032 are symmetrical on the top. A first end 121 of the elastic wedge-shaped protuberances 1032 connects the top 1033 and a second end 122 is an elastic and bent free end. Under the natural state, the outside surface 123 of the elastic wedge-shaped protuberances 1032 is an inclined plane. The inclined plane and the long rod 102 form an acute angle a. There is a gap 1034 between the inside surface 124 of the elastic wedge-shaped protuberances 1032 and the long rod 102. The gap 1034 is used to provide an elastic and bent space for the elastic wedge-shaped protuberances 1032. Therefore, the elastic wedge-shaped protuberances 1032 can pass through the first through-hole and the second through-hole.

Under the state that the second end 122 bends to the maximum, the outside surface 123 of the elastic wedge-shaped protuberances 1032 is approximately a flat surface parallel to the long rod 102. At this moment, the distance of the outside surface 123 between the two elastic and bent wedge-shaped protuberances 1032 is approximately equal to the diameter of the first through-hole and the second through-hole.

Compared with the prior art, the back light module of this invention fastens the PCB 30 and the rear panel 20 through the elastic clamping fastener 10. At the same time, since the top 1033 of the elastic clamping fastener 10 is higher than the surface of the LED 50, the LGP 40 first touches the top 1033 of the elastic clamping fastener 10 and the top 1033 resists against the LGP 40 when the LGP 40 deforms due to reasons such as thermal expansion or assembling allowance et al., which can avoid that the LGP 40 is melted when touching the high-temperature surface of the LED 50. With low cost, the back light module of this invention is easily assembled and can prevent the LGP 40 from melting.

Figure 5:
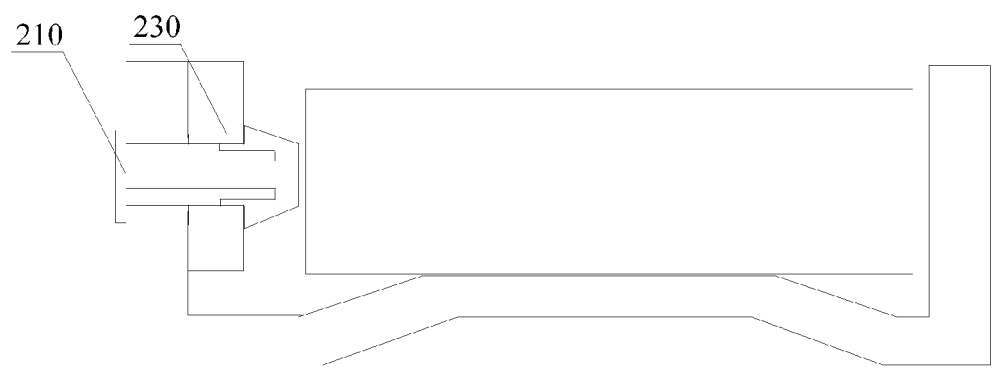
FIG. 5 is the section view enlarged drawing of the second embodiment of the back light module of this invention.
Figure 6:
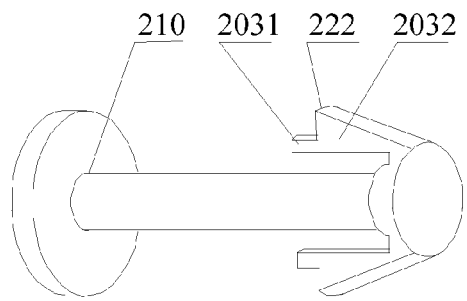
FIG. 6 is the solid enlarged drawing of the elastic clamping fastener in the second embodiment of the back light module of this invention.
Figure 7:
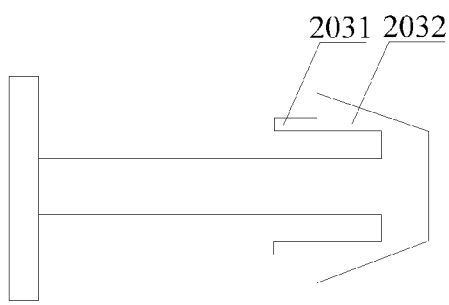
FIG. 7 is the main view enlarged drawing of the elastic clamping fastener shown in FIG. 6.

Please refer to FIG. 5, FIG. 6 and FIG. 7. The back light module of the second embodiment in this invention is similar to the above first embodiment. The difference is that the elastic clamping fastener 210 structures are different. The elastic clamping fastener 210 of the embodiment is similar to the elastic clamping fastener 10 of the first embodiment. The difference is that the second end 222 of the elastic wedge-shaped protuberance 2032 is extended to form a bump 2031. The distance between the exterior sides of the two bumps 2031 of the two elastic wedge-shaped protuberances 2032 is slightly larger than the diameter of the second through-hole (not numbered) of the PCB 230, so that the bump 2031 is clamped in the internal of the second through-hole (not numbered) to play a better role in positioning.

Figure 8:
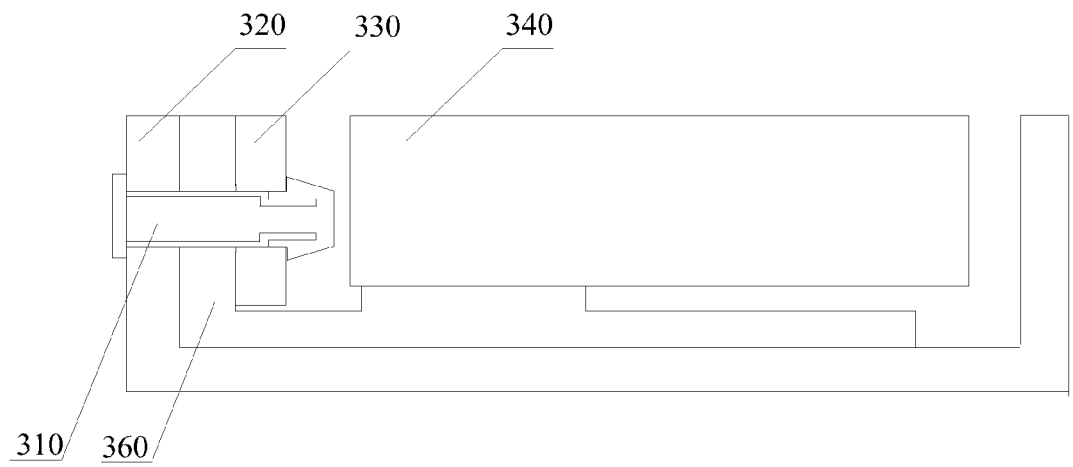
FIG. 8 is the section view enlarged drawing of the third embodiment of the back light module of this invention.

Please refer to FIG. 8. The back light module of the third embodiment in this invention is similar to that of the first embodiment. The difference is that the back light module further arranges a cooling fin 360 between the PCB 330 and the rear panel 320. The elastic clamping fastener 310 successively passes through the rear panel 320, the cooling fin 360 and the PCB 330 and fixes the PCB 330 and the rear panel 320. The bottom board of the rear panel 320 is flat. A protuberance to support the LGP 340 is arranged in the corresponding position on the bottom of the cooling fin 360 to position the LGP 340 in the height relative to the LED.

Figure 9:
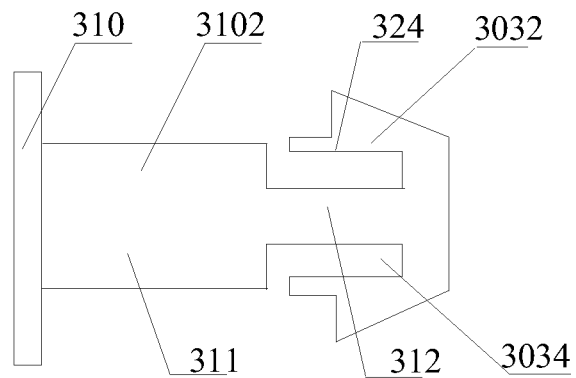
FIG. 9 is the main view enlarged drawing of the elastic clamping fastener in the third embodiment of the back light module of this invention.

Please refer to FIG. 9. The elastic clamping fastener 310 of the back light module of the third embodiment in this invention is similar to the elastic clamping fastener 210 of the second embodiment. The difference is that the long rod 3102 includes a first part 311 and a second first part 312 with different diameters. The first part 311 is positioned in the first through-hoe of the sidewall (not labeled) of the rear panel 320 and the second through-hole (not labeled) of the PCB 330. The diameter of the first part 311 basically equals to that of the first through-hole and the second through-hole, so that the elastic clamping fastener can fix the rear panel 320 and the PCB 330 more firmly. The second part 312 is positioned on one side of the PCB 330 and the diameter of the second part 312 is smaller than that of the first part 311, so that a space 3034 for the elastic wedge-shaped protuberance 3032 to bend can be formed between the second part 312 and the interior surface 324 of the elastic wedge-shaped protuberance 3032.

Figure 10:
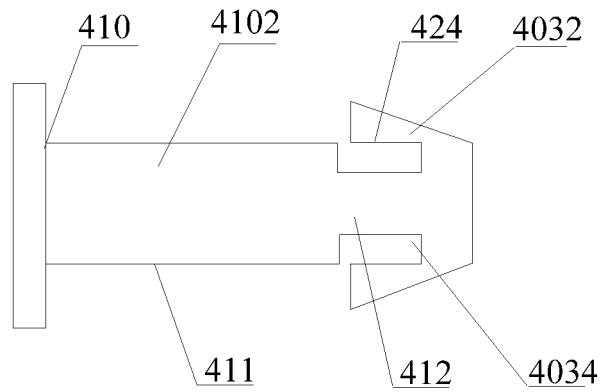
FIG. 10 is the main view enlarged drawing of the elastic clamping fastener in the fourth embodiment of the back light module of this invention; and The purpose realization, functional characteristics, and advantages of this invention will combine the embodiments and be further stated referring to the figures.

Please refer to FIG. 10. The elastic clamping fastener 410 of the back light module of the fourth embodiment in this invention is similar to the elastic clamping fastener 10 of the first embodiment. The difference is that the long rod 4102 includes a first part 411 and a second part 412 with different diameters. The first part 411 is positioned in the first through-hole (not shown in the figure) of the sidewall of the rear panel (not shown in the figure) and the second through-hole (not shown in the figure) of the PCB (not shown in the figure). The diameter of the first part 411 basically equals to that of the first through-hole and the second through-hole, so that the elastic clamping fastener 410 can fix the rear panel and the PCB more firmly. The second part 412 is positioned on one side of the PCB and the diameter of the second part 412 is smaller than that of the first part 411, so that a space 4034 for the elastic wedge-shaped protuberance 4032 to bend can be formed between the interior surfaces of the second part 412 and the elastic wedge-shaped protuberance 4032.

The back light module of this invention is not limited to the above embodiments. For example, the elastic clamping fastener of every embodiment can be applied in the back light module of the third embodiment; in the above embodiments, the base plate 101 can be round as well as quadrate, rectangular and polylateral, etc.

In the above embodiments, the number of the elastic wedge-shaped protuberances 1032, 2032, 3032 and 4032 can be one or more than 3. The long rod 102 of the elastic clamping fastener 10 of the first embodiment can also be cuboids, etc., correspondingly, the first through-hole of the sidewall 202 of the rear panel 20 and the second through-hole of the PCB 30 can also be rectangular, etc.

Furthermore, this invention also puts forward one kind of the liquid crystal display, which includes a liquid crystal panel and the back light module of the above embodiments. Here, we will not go further on them.

The embodiments mentioned as above are only the preferential embodiments of this invention, and can not limit the patent claim. The equivalent structure or flow change formed by using the description of this invention and contents of drawings, or direct or indirect application to other relevant technical fields, are all included in the extent of patent protection of this invention.

What is claimed is:

1. A back light module comprising a rear panel, an LGP, a PCB and a plurality of LEDs, the rear panel comprising a base plate and at least one sidewall, the LGP being positioned on the base plate, the PCB being positioned on the sidewall of the rear panel, and the LEDs being positioned on the PCB, wherein the back light module further comprises at least one elastic clamping fastener which successively passes through the rear panel and the PCB to fasten the rear panel and the PCB, the top of the elastic clamping fastener is higher than the surface of the LEDs; wherein at least one first through-hole is arranged on the sidewall of the rear panel, at least one second through-hole corresponding to the first through-hole is arranged on the PCB, and the elastic clamping fastener successively passes through the first through-hole and the second through-hole to fasten the rear panel and the PCB; and wherein the elastic clamping fastener comprises a base plate, a fastener and a long rod connecting the base plate and the fastener, the base plate is positioned on one side of the sidewall of the rear panel, the long rod is positioned in the first through-hole and the second through-hole of the PCB, and the fastener is positioned on one side of the PCB.

2. The back light module as claimed in claim 1, wherein the LGP comprises a light input surface, the fastener comprises a top, and the surface of the top is higher than that of the LED and is parallel to the light input surface of the LGP.

3. The back light module as claimed in claim 2, wherein the fastener further comprises at least one elastic wedge-shaped protuberance, the first end of which is connected to the top, and the second end is a free end which can be bent elastically.

4. The back light module as claimed in claim 3, wherein there are two elastic wedge-shaped protuberances, which are symmetrical centered on the top.

5. The back light module as claimed in claim 3, wherein the surface of the exterior side of the elastic wedge-shaped protuberance is a slope, an acute angle is formed between the slope and the long rod, a gap is formed between the surface of the interior side of the elastic wedge-shaped protuberance and the long rod, and the gap is used to provide a bent space for the elastic wedge-shaped protuberance.

6. The back light module as claimed in claim 3, wherein the second end of the elastic wedge-shaped protuberance is extended to form a bump which is clamped in the second through-hole of the PCB.

7. The back light module as claimed in claim 6, wherein the long rod comprises a first part and a second part with different diameters, the diameter of the first part equals to that of the first through-hole and the second through-hole, and the diameter of the second part is smaller than that of the first part.

8. The back light module as claimed in claim 6, wherein in the status that the second end is bent to the greatest extent, the surface of the exterior side of the elastic wedge-shaped protuberance is a flat surface parallel to the long rod, and a distance between the surfaces of the exterior side of the two bent elastic wedge-shaped protuberances equals to diameters of the first through-hole and the second through-hole.

9. The back light module as claimed in claim 8, wherein the distance between exterior sides of the bumps of the two elastic wedge-shaped protuberances is larger than the diameter of the second through-hole of the PCB.

10. The back light module as claimed in claim 1, wherein the elastic clamping fastener is equipped by intervals with the two LEDs.

11. The back light module as claimed in claim 1, wherein the protuberance to support the LGP is arranged on the base plate of the rear panel, which is used to position the LGP in the height relative to the LED.

12. The back light module as claimed in claim 1, wherein a cooling fin is arranged between the PCB and the rear panel, and the elastic clamping fastener successively passes through the rear panel, the cooling fin and the PCB to fasten the PCB and the rear panel.

13. The back light module as claimed in claim 12, wherein the base plate of the rear panel is flat, and a protuberance to support the LGP is arranged in the corresponding position of the base of the cooling fin so as to position the LGP in the height relative to the LED.

14. A liquid crystal display, comprising a liquid crystal display board and a back light module, the back light module comprising a rear panel, an LGP, a PCB and a plurality of LEDs, the rear panel comprising a base plate and at least a sidewall, the LGP being positioned on the base plate, the PCB being arranged on the sidewall of the rear panel, and the LEDs being arranged on the PCB, wherein the back light module further comprises at least an elastic clamping fastener, which successively passes through the rear panel and the PCB to fasten the rear panel and the PCB, the top of the elastic clamping fastener is higher than the surface of the LEDs; wherein at least a first through-hole is arranged on the sidewall of the rear panel, at least a second through-hole is arranged on the PCB corresponding to the first through-hole, and the elastic clamping fastener successively passes through the first through-hole and the second through-hole to fasten the rear panel and the PCB; and wherein the elastic clamping fastener comprises a base plate, a fastener and a long rod connecting the base plate and the fastener, the base plate is positioned on one side of the sidewall of the rear panel, the long rod is positioned in the first through-hole and the second through-hole of the PCB, and the fastener is positioned on one side of the PCB.

15. The liquid crystal display as claimed in claim 14, wherein the LGP comprises a light input surface, and the fastener comprises a top, the surface of which is higher than that of the LED and is a surface parallel to the light input surface of the LGP.

16. The liquid crystal display as claimed in claim 15, wherein the fastener further comprises at least an elastic wedge-shaped protuberance, the first end of which is connected to the top and the second end is a free end which can be bent elastically.

* * * * *